United States Patent
Daoud

(10) Patent No.: US 6,456,772 B1
(45) Date of Patent: Sep. 24, 2002

(54) SYSTEM FOR REMOVABLE ATTACHMENT OF TWO OBJECTS

(75) Inventor: Bassel H. Daoud, Parsippany, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/400,014

(22) Filed: Sep. 21, 1999

(51) Int. Cl.⁷ .................................................. G02B 6/00

(52) U.S. Cl. ........................ 385/135; 385/137; 411/508

(58) Field of Search ................................ 385/134, 135, 385/136, 137; 411/500, 501, 502, 504, 505, 508, 509, 510, 511, 516

(56) References Cited

U.S. PATENT DOCUMENTS

| | | | |
|---|---|---|---|
| 2,896,889 A | * 7/1959 | Hershberger et al. | |
| 3,856,050 A | * 12/1974 | Rooney | 138/96 R |
| 5,572,617 A | * 11/1996 | Bernhardt et al. | 385/135 |
| 5,640,478 A | * 6/1997 | Roller | 385/136 |
| 6,206,606 B1 | * 3/2001 | Mita et al. | 411/349 |

* cited by examiner

Primary Examiner—Cassandra Spyrou
Assistant Examiner—Euncha Cherry

(57) ABSTRACT

A system for removably attaching a first object to a second object comprising an attachment member on said first object which cooperates with an opening for receiving the attachment member on the second object. The attachment member is deformable from a static state to an extended state during the application of a force on the attachment member wherein the attachment member has a greater width in its static state than in its extended state. The width of the opening cooperating with the attachment member is less than at least a portion of the width of the attachment member in its static state but substantially equal to or greater than the width of the attachment member in its extended state.

The objects are attached by inserting a leading portion of the attachment member through the opening, grasping the leading portion on the underside of the second object and exerting a downward force to deform the attachment member into its extended state, moving the first object into an attachment position and releasing the leading portion of the attachment member.

15 Claims, 2 Drawing Sheets

SLACK FIBERS

SYSTEM FOR REMOVABLE ATTACHMENT OF TWO OBJECTS

FIELD OF THE INVENTION

The present invention relates to a system for removable attachment of two objects and, more particularly, removable attachment that does not require tools for attachment or removal.

BACKGROUND OF THE INVENTION

Fiber optic cable is joined using specialized splices which are generally made of glass and are significantly larger and heavier than the fiber itself. As such, improper handling or storage of the splice can damage the fiber adjacent the splice. To avoid such damage, splice holders have been developed to hold the splices.

Splice holders for fiber optic splices are usually fabricated of an elastic material having flexible vertical ribs or fins extending upwardly from a base and spaced according to the thickness of the splices intended to be held. The splices are placed between the fins and are generally held by a friction fit. The holders are usually found attached to a splice tray which has provisions for the fiber optic cable entering and leaving the splice to further avoid damage to the fiber optic cable.

Presently, the splice holders are attached to the splice tray by the use of an adhesive, double sided tape or the like, placed between the bottom of the base of the splice holder and the splice tray. These techniques also require that the installer carry adhesive, double sided tape or other adhesive products which must be applied to the surfaces prior to attachment. Additionally, these methods result in the relatively permanent attachment of the holder to the tray so that removal is difficult and generally leaves a residue from the adhesive, tape, etc. on the tray, holder or both.

SUMMARY OF THE INVENTION

The present invention is directed to a system for removably attaching a first object to a second object comprising an attachment member on the first object and an opening for receiving the attachment member on the second object, said attachment member being deformable from a static state to an extended state during the application of a force on the attachment member wherein the attachment member has a greater width in its static state than in its extended state, the width of the opening being less than at least a portion of the width of the attachment member in its static state but greater than the width of the attachment member in its extended state.

When the first object is to be attached to the second object, a leading end of the attachment member is preferably passed through the opening on the second object to the underside of the second object. The leading end of the attachment member is grasped by the user on the underside of the second object and pulled to deform the attachment member from its static to its extended state. The first object can then be brought down to the second object and the attachment member released so that it returns to its static state, thereby engaging the opening in the second object.

BRIEF DESCRIPTION OF THE DRAWINGS

The following drawings, in which like reference characters represent like parts, are intended merely to illustrate the invention without limiting the invention in any manner whatsoever.

DETAILED DESCRIPTION OF THE PREFERRED EMBODIMENT

Figure 1:
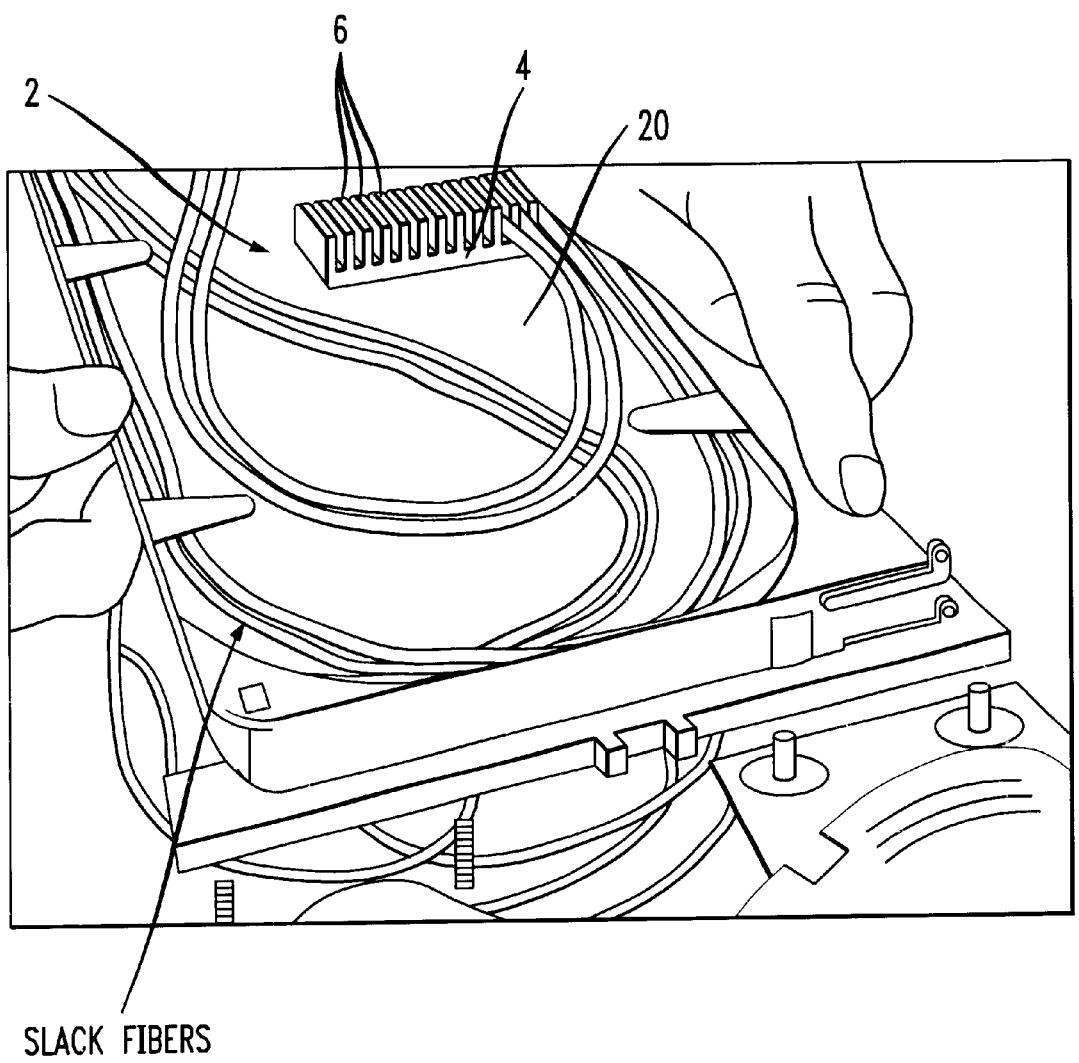
FIG. 1 is a perspective view of a splice holder in its environment attached to a splice tray.

As is well known in the fiber optic art, splice holders 2, used for holding fiber optic splices, include a base 4 and retention members 6 on the base 4 for holding fiber optic splices. This holder 2 is usually attached to a device 20 such as a splice tray for holding the fiber entering and exiting the splices without damaging the fiber. See FIG. 1.

Figure 2:
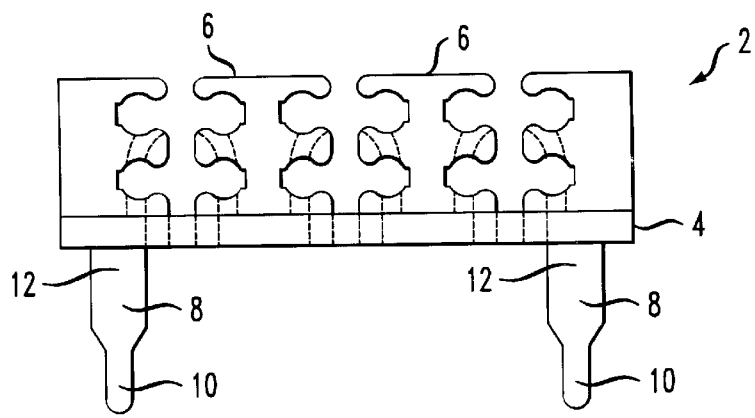
FIG. 2 is an elevational view of a splice holder having the preferred attachment means of the present invention.

The present invention resides in the use of an attachment system including elastic elongated attachment members 8 extending downwardly from the base 4 of the splice holder 2 for removably attaching the splice holder 2 to a splice tray or similar device 20. See FIG. 2.

In its most preferred embodiment, the splice holder 2 has an attachment member 8 corresponding generally to each corner of the base 4. The attachment members 8 correspond in number and location to openings 22 in the device 20 to which the splice holder 2 is to be attached.

Preferably, the attachment members 8 have a leading portion 10 and a connection portion 12. The leading portion 10 is preferably thinner than the connection portion 12, as well as thinner than the opening 22, to provide for easy insertion of the attachment members 8 into the openings 22 of the device 20. The connection portion 12 is preferably thicker than the leading portion 10, as well as thicker than the opening 22, to engage the opening 22 when the splice holder 2 is properly attached to the device 20. Correspondingly, the openings 22 are formed of a size that the leading portion 10 slips through but the connection portion 12 in its static configuration does not.

Moreover, the reduced width leading portion 10 of the attachment member 8 is of a length sufficient to allow at least a portion of the leading portion 10 to pass entirely through the opening 22 to the underside of the device 20. This provides for the user to grasp the leading portion 10 of the attachment member 8 on the underside of the device 20, the side opposite that to which the holder 2 is being mounted.

Figure 3A:
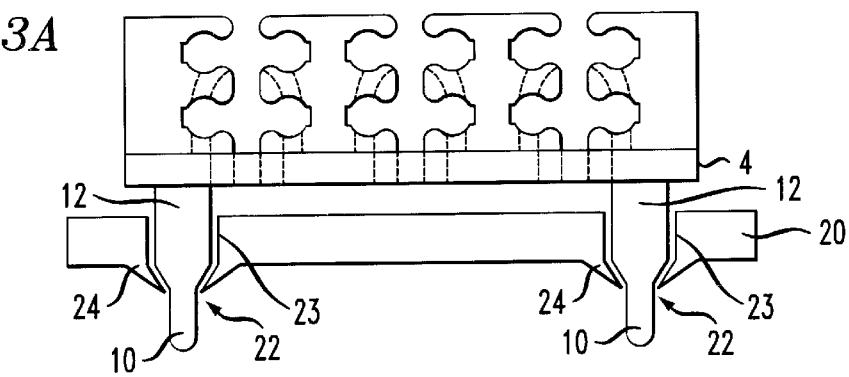
FIG. 3A is an elevational view of the preferred splice holder aligned with the device to which it will be attached, with the attachment members in their static state.

As shown in FIG. 3A, the attachment members 8 are positioned over the corresponding openings 22 in the device 20. The attachment members 8 are elongated so that at least the leading portion 10 extends through to the underside of the device 20 and the connection portion 12 rests on the opening 22 when the attachment member 8 is in its static state.

Figure 3B:
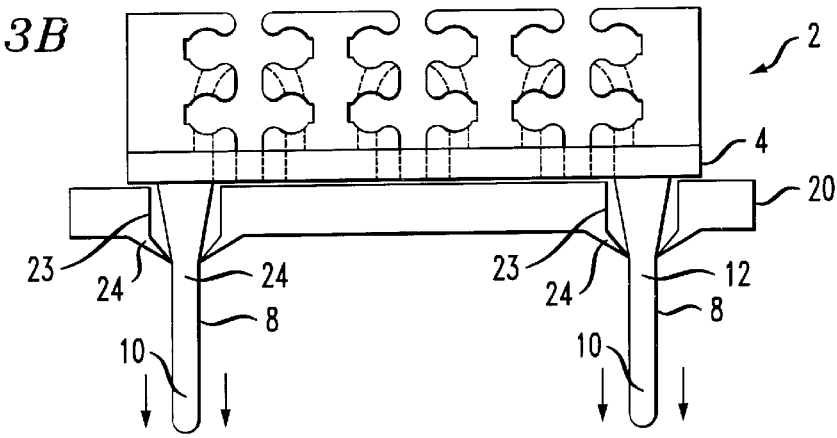
FIG. 3B is an elevational view of the preferred splice holder, with the attachment members in their extended state.

As shown in FIG. 3B, a force applied downwardly on the leading portion 10 of the attachment member 8 causes the attachment member 8 to stretch to its extended state. Stretching the elastic member 8 reduces the width of the connection portion 12 so that the splice holder 2 can be brought down into its engagement position with the device 20 to which it is being attached.

When the splice holder 2 is properly positioned on the device 20, the force is removed from the leading portion 10 of the attachment member 8 and the attachment member 8 returns to its static state. However, as shown in FIG. 3C, the connection portion 12, being of a greater dimension than the opening 22 when in its static state, engages the opening 22 and secures the splice holder 2 to the device 20.

To release the splice holder 2 from the device 20 the user merely pulls on the leading portion 10 of the attachment member 8 to stretch the attachment member 8 into its extended state, thereby reducing the width of the connection portion 12, and pulls up on the splice holder 2.

Figure 3C:
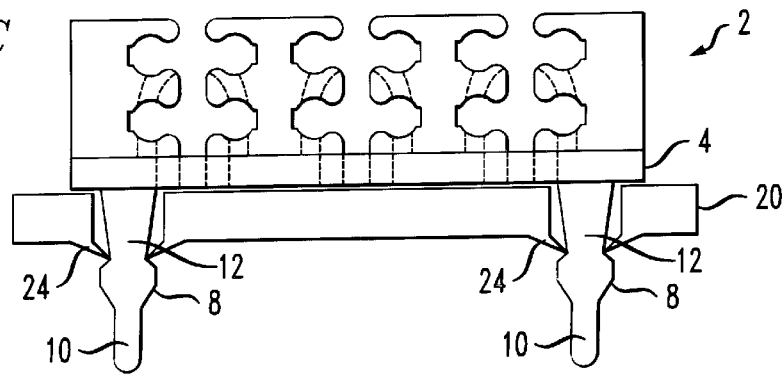
FIG. 3C is an elevational view of the preferred splice holder attached to the device.

In its most preferred embodiment, shown in FIGS. 3A–C, the openings 22 in the device 20 are formed with a pointed edge 24 on the side opposite that to which the splice holder 2 is mounted. The pointed edge 24 extends downwardly and inwardly to form the opening 22 having a reduced diameter than the shank 23 of the hole. Although not necessary, this configuration of the opening 22 has been shown to provide a positive engagement with connection portion 12 of the attachment member 8.

Since the dimensions of the attachment member 8 are interdependent on, inter alia, the size of the opening 22 and the thickness of the device 20, the present invention is not limited thereby. It is understood that various dimensions for the openings 22 and attachment members 8 can be used. Additionally, the dimensions will depend on the application.

For the described environment of a splice holder 2 on a splice tray 20, it has been determined that an attachment member 8 having a leading portion 10 with a diameter of less than 0.10" and a connection portion 12 with a diameter of about 0.14" when in its static state properly engages a hole having a shank 23 with a diameter of about 0.15" and a pointed edge 24 with an opening 22 having a diameter of about 0.10". The length of the leading portion 10 passing through to the underside of the splice tray 20 can be any suitable length but need only be long enough to grasp on the underside of the device 20. A leading portion 10 which extends at least about 3/16" beyond the bottom of the device 20 when the splice holder 2 is merely placed on the device 20 is suitable.

Although silicone rubber has been found to be a suitable material for the attachment members 8, other materials which exhibit the described elastic characteristics can be used. Other possible materials can include Neoprene.

Preferably, the attachment members 8 are formed from the same material as the splice holder 2 so that the retention members 6, base 4 and attachment members 8 can be molded as a single, integral piece. Alternatively, the attachment members 8 can be secured to the base 4 in a variety of ways known to those skilled in the art. Of course, if the attachment members 8 are not integral to the object, it is preferred that they be secured on the base prior to the technician going into the field to minimize assembly time and quality issues inherent in field fabrication.

Variations, modifications and alterations to the above described invention will make themselves apparent to those skilled in the art. All such variations, modifications and alterations are fully intended to fall within the spirit and scope of the present invention.

I claim:

1. A system for removably attaching a fiber optic splice holder to a splice tray comprising an attachment member on said fiber optic splice holder which cooperates with an opening for receiving the attachment member on the splice tray, the attachment member being deformable from a static state to an extended state during application of an outward force on the attachment member wherein the attachment member has a greater width in its static state than in its extended state, the width of the opening being less than at least a portion of the width of the attachment member in its static state but substantially equal to or greater than the width of the attachment member in its extended state.

2. The system of claim 1 wherein the attachment member comprises a leading portion and a connection portion, the leading portion being of a smaller width than the connection portion when the attachment member is in its static state.

3. The system of claim 2 wherein the leading portion of the attachment member extends through the opening to an underside of the splice tray and the connection portion does not fit into the opening when the attachment member is in its static state.

4. The system of claim 1 wherein the attachment member is formed of a silicone rubber or Neoprene.

5. The system of claim 4 wherein the attachment member is formed of silicone rubber.

6. The system of claim 1 wherein the attachment member is formed integral the fiber optic splice holder.

7. The system of claim 1 wherein the opening has a pointed edge on a side opposite that into which the attachment member is inserted, said pointed edge extending downwardly and inwardly into said opening.

8. The system of claim 1 wherein the fiber optic splice holder comprises a plurality of attachment members corresponding to a plurality of openings on the splice tray.

9. A splice holder for holding optical fiber splices, said splice holder having a base and at least one retention member for holding a fiber optic splice, comprising at least one attachment member being deformable from a static state to an extended state upon the application of a downward force wherein the attachment member has a greater width when in its static state than in its extended state.

10. The splice holder of claim 9 wherein the attachment member comprises a leading portion and a connection portion, the leading portion being of a smaller width than the connection portion when the attachment member is in its static state.

11. The splice holder of claim 9 wherein the attachment member is formed of a silicone rubber or Neoprene.

12. The splice holder of claim 11 wherein the attachment member is formed of silicone rubber.

13. The splice holder of claim 9 wherein the attachment member is formed integral with the base.

14. The splice holder of claim 9 further comprising a plurality of attachment members extending downwardly from the base.

15. A method for removably attaching a splice holder to a splice tray, the splice holder having a base, at least one retention member for holding a fiber optic splice and at least one attachment member extending downwardly from the base, the attachment member being deformable from a static state to an extended state wherein the attachment member has a greater width when in its static state than its extended state, said splice tray having at least one opening corresponding in size and location to said attachment member, comprising the steps of inserting a leading edge of the attachment member into the opening so that the leading edge passes through to an underside of the splice tray opposite that to which the splice holder is to be attached, grasping the leading edge on the underside of the splice tray and exerting a downward force to deform the attachment member to its extended state, moving the splice holder toward the splice tray and into its attachment position, and releasing the leading portion of the attachment member.

* * * * *